(12) United States Patent
Lim et al.

(10) Patent No.: US 9,210,076 B2
(45) Date of Patent: Dec. 8, 2015

(54) APPARATUS AND METHOD FOR PROCESSING DATA OF MOBILE TERMINAL

(71) Applicant: Samsung Electronics Co. Ltd., Suwon-si, Gyeonggi-do (KR)

(72) Inventors: Wansoo Lim, Seongnam-si (KR); Dohyoung Kim, Seoul (KR); Minkyung Kim, Seoul (KR); Youngmi Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 288 days.

(21) Appl. No.: 13/774,500

(22) Filed: Feb. 22, 2013

(65) Prior Publication Data

US 2013/0227035 A1  Aug. 29, 2013

(30) Foreign Application Priority Data

Feb. 24, 2012   (KR) .................. 10-2012-0019307

(51) Int. Cl.
| G06F 15/173 | (2006.01) |
| H04L 12/771 | (2013.01) |
| G06F 17/30 | (2006.01) |
| H04L 29/08 | (2006.01) |

(52) U.S. Cl.
CPC ........ *H04L 45/563* (2013.01); *G06F 17/30905* (2013.01); *H04L 67/06* (2013.01); *H04L 67/10* (2013.01)

(58) Field of Classification Search
USPC .................................. 709/224, 203, 217, 220
See application file for complete search history.

(56) References Cited

U.S. PATENT DOCUMENTS

| 7,460,021 | B1 | 12/2008 | Bacon |
| 2004/0088656 | A1 | 5/2004 | Washio |
| 2008/0317068 | A1 | 12/2008 | Sagar et al. |
| 2009/0197577 | A1 | 8/2009 | Agre et al. |
| 2010/0159909 | A1 | 6/2010 | Stifelman |
| 2010/0198944 | A1* | 8/2010 | Ho et al. ........................ 709/217 |
| 2011/0256846 | A1 | 10/2011 | Sadana et al. |

FOREIGN PATENT DOCUMENTS

| KR | 10-2005-0116260 A | 12/2005 |
| KR | 10-2010-0114117 A | 10/2010 |

\* cited by examiner

*Primary Examiner* — El Hadji Sall
(74) *Attorney, Agent, or Firm* — Jefferson IP Law, LLP

(57) ABSTRACT

A method of processing data of a terminal device is provided. The method includes processing selected cloud data, requesting a download of the selected cloud data when selecting a function menu while processing the selected cloud data, downloading the cloud data, and automatically setting the downloaded cloud data as data of the selected function.

19 Claims, 8 Drawing Sheets

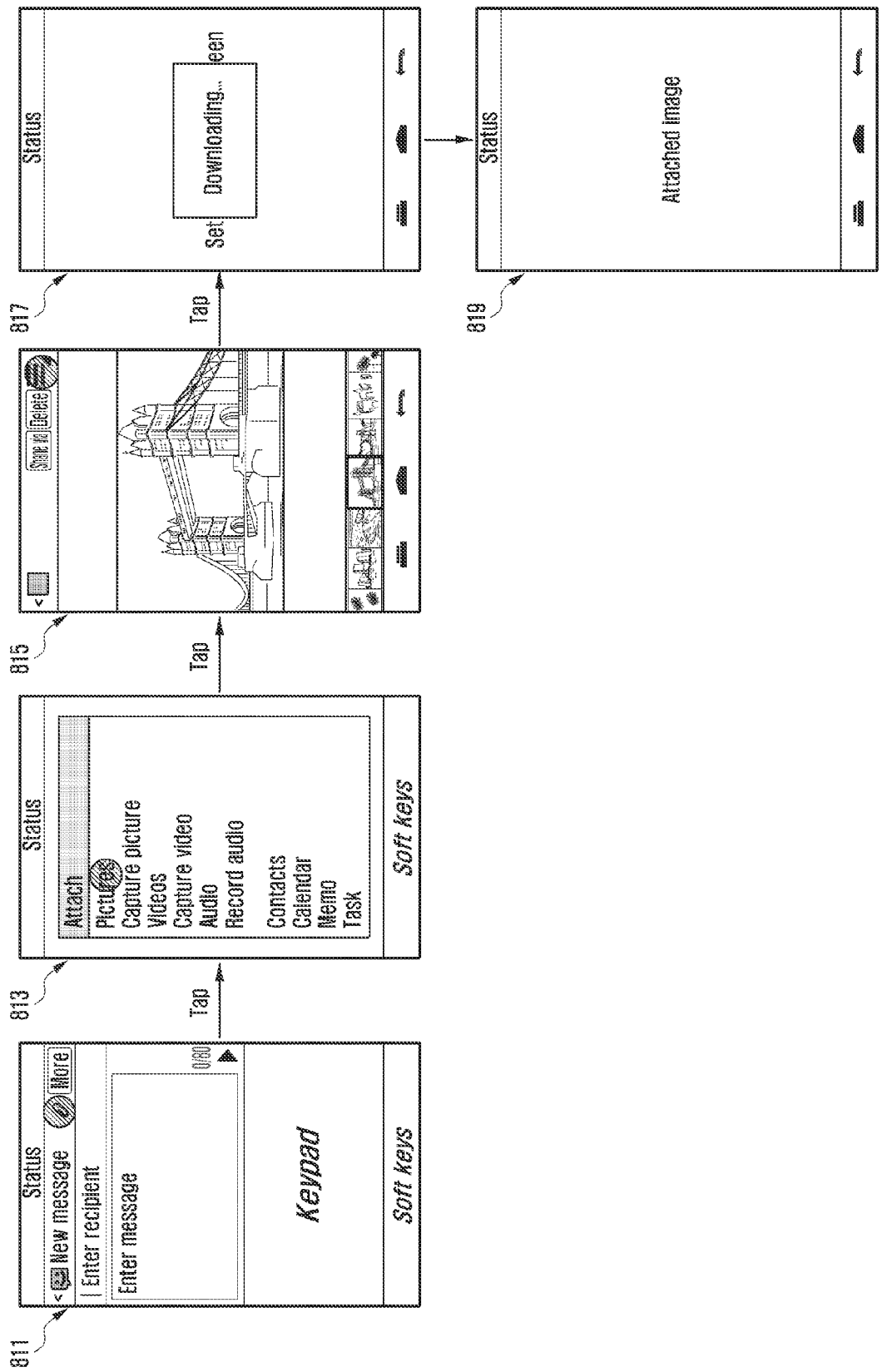

APPARATUS AND METHOD FOR PROCESSING DATA OF MOBILE TERMINAL

PRIORITY

This application claims the benefit under 35 U.S.C. §119 (a) of a Korean patent application filed on Feb. 24, 2012 in the Korean Intellectual Property Office and assigned Serial No. 10-2012-0019307, the entire disclosure of which is hereby incorporated by reference.

BACKGROUND OF THE INVENTION

1. Field of the Invention

The present invention relates to an apparatus and method for processing data of a mobile terminal. More particularly, the present invention relates to an apparatus and method for automatically setting downloaded data using a function which is set in a mobile terminal.

2. Description of the Related Art

Generally, a terminal such as a mobile terminal according to the related art refers to a device for performing a function while user carries the device. The mobile terminal may be a device such as a mobile phone, a tablet Personal Computer (PC), a notebook computer, an MP3 player, and the like. Such a mobile terminal may perform various functions such as communication, photographing, Internet, video replay, broadcast reception, and the like. However, design of such a mobile terminal according to the related art emphasizes portability. Thus, mobile terminals according to the related art are limited in the capacity of the memory in which data is stored. Hence, in order to overcome such a limited memory capacity, various efforts and methods are being considered. One of such methods is a cloud service.

The cloud service refers to a service in which content such as a movie, picture, music, document, media file, address list, and the like is stored in a server, and in which the content may be downloaded and used in a terminal such as a mobile terminal. The mobile terminal may set specific data stored in the cloud server as a specific function of the mobile terminal using a cloud service. However, if a user intends to set specific data stored in the cloud server as a specific function of the mobile terminal, first, the data should be downloaded and the operation of setting the data as the function should be performed. For example, according to the related art, in order to apply a use experience such as a function setting of a mobile terminal to a file within the cloud, the file should be manually downloaded and then the use experience should be applied.

Therefore, a need exists for a system and method for automatically setting data downloaded from a server as a corresponding function if a specific function is selected and cloud data is selected in a mobile terminal which shares data with the server.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and apparatus for automatically setting data downloaded from a server as a corresponding function if a specific function is selected and cloud data is selected in a mobile terminal which shares data with the server. To this end, if a file within a cloud is selected as specific function of a mobile terminal according to an exemplary embodiment of the present invention, the mobile terminal automatically downloads the file and sets the file as the function.

In accordance with an aspect of the present invention, a method of processing data of a terminal device is provided. The method includes processing selected cloud data, requesting a download of the selected cloud data when selecting a function menu while processing the selected cloud data, downloading the selected cloud data, and automatically setting the downloaded cloud data as data of the selected function.

In accordance with another aspect of the present invention, a method of processing data of a terminal device is provided. The method includes performing a communication function, requesting a download of cloud data selected when selecting cloud data in a state in which the communication function is performed, downloading the selected cloud data, and adding the downloaded cloud data to the communication function and automatically transmitting the data.

In accordance with another aspect of the present invention, a mobile terminal, which is synchronized with a server, for processing cloud data is provided. The mobile terminal includes a communication unit for communicating with a server storing cloud data through an Internet network, a memory for storing the cloud data, a display unit for displaying the cloud data, and a controller for displaying the cloud data, for requesting a download of the cloud data through the communication unit when selecting a function menu in a state in which the cloud data is displayed, for downloading the selected cloud data, for storing the downloaded cloud data in the data of the selected function, and for automatically setting the stored data as the data of the selection function.

In accordance with another aspect of the present invention, a method of processing cloud data of a terminal device is provided. The method includes displaying cloud data, displaying a screen menu which may be set when selecting a screen setting function in a state in which cloud data is displayed, requesting a download of cloud data being displayed when selecting a screen from the displayed screen menu, downloading the selected cloud data; and automatically setting the downloaded cloud data as data of selected screen.

According to exemplary embodiments of the present invention, in a state in which cloud data is displayed and/or processed, if a specific function (wallpaper, tone, etc.) of the mobile terminal is selected, the mobile terminal automatically downloads cloud data, which is being displayed or processed, and sets the data as the function. Further, if cloud data is selected in a state in which communication is performed, the mobile terminal may download automatically selected cloud data, add the data to a communication function and transmit the added data. Hence, according to a cloud service method of exemplary embodiments of the present invention, cloud data may be set as data of the function without performing several operations. For example, the procedure may be performed by promptly downloading a cloud file from a server within the current application without perform a dedicated application for the downloading of the file within the cloud in a mobile terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 8 illustrates an example of adding a cloud image to an e-mail and transmitting the e-mail during an operation such as, for example, the operation of FIG. 7 according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

According to exemplary embodiments of the present invention, when processing cloud data in a mobile terminal which is synchronized with a server, if the cloud data is selected so as to be set as a specific function, the corresponding data, which is downloaded from the server, is automatically set as the selected function. For example, when the file (e.g., selected cloud data) within the cloud server is intended to be set as wallpaper or a tone (e.g., a ring tone) indicating a specific function of a mobile terminal, if the file is downloaded after selecting the file as a desired function, the mobile terminal automatically sets the downloaded file as the function.

Figure 1:
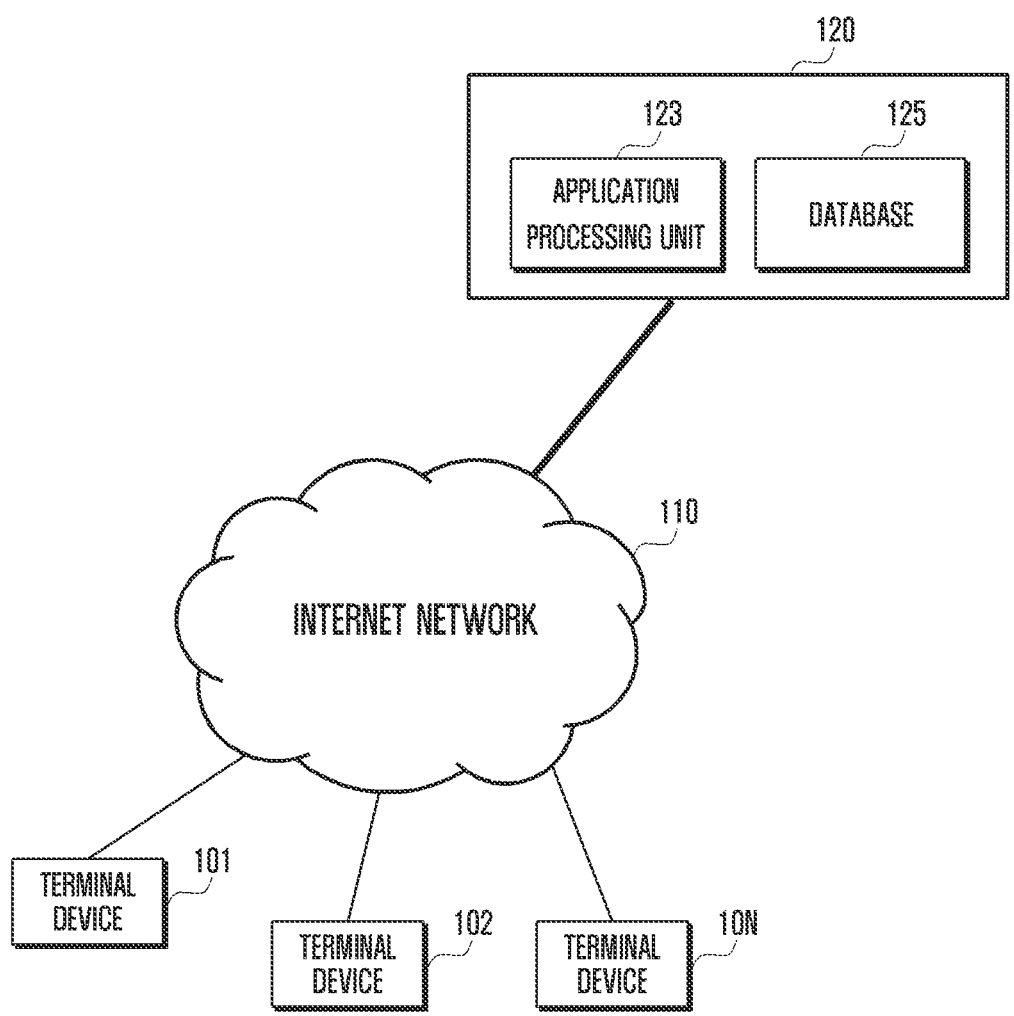
FIG. 1 illustrates a configuration of a cloud service system according to an exemplary embodiment of the present invention.

FIG. 1 illustrates a configuration of a cloud service system according to an exemplary embodiment of the present invention.

Referring to FIG. 1, terminal devices 101 to 10N are connected to a server 120 through Internet network 110. As an example, the terminal devices 101 to 10N may be a mobile phone, a tablet Personal Computer (PC), a notebook computer, an MP3 player, and the like. Further, the terminal devices 101 to 10N maintain the state in which the server 120 is synchronized with Meta information sets. The server 120 includes an application processing unit 123 for processing various content, and a database 125 for storing Meta information and actual data corresponding thereto.

Cloud service systems are evolving to current platform services. For example, a personal cloud service has been merely a service which provides a storage space of the existing web hard type. However, cloud service systems are currently being upgraded as platform services which allow use of various applications such as software. To this end, a cloud service system may provide services of various applications through cooperation between a communication company and an application service provider. For example, a client may freely edit a document in a smart phone, a tablet PC, and the like, as well as a PC in a company or at home, without installing a separate software program. If an application for editing of a document is downloaded, a software program, which has been used in a PC, may also be used in another PC, an Android or iOS based mobile terminal, a tablet PC, a notebook computer, and the like without an installation process. Further, such applications are being diversified. As such, a movie, game, documentary, music, picture, and the like as well as entertainment may be processed using a cloud service.

Further, in a Digital Living Network Alliance (DLNA) based service, in which wired and wireless parts have been integrated, content may be freely transmitted and shared through a home network. For example, content stored in the cloud may be utilized through various devices at home, which are connected in a wired or wireless manner.

The mobile terminal according to an exemplary embodiment of the present invention may include a communication unit for communicating with a server which stores cloud data through an Internet network, a memory for storing cloud data, a display unit for displaying cloud data, and a controller for displaying the cloud data in the display unit, for requesting download of the cloud data through the communication unit when selecting the function menu in a state in which the cloud data is displayed, for storing the downloaded cloud data as data of the selected function in the memory, and for automatically setting the cloud data as the data of the selection function.

As an example, in a state in which the communication function is performed through the communication unit, when selecting cloud data, the controller requests the download of the selected cloud data, and adds the downloaded cloud data in the communication function so as to be automatically transmitted.

Figure 2:
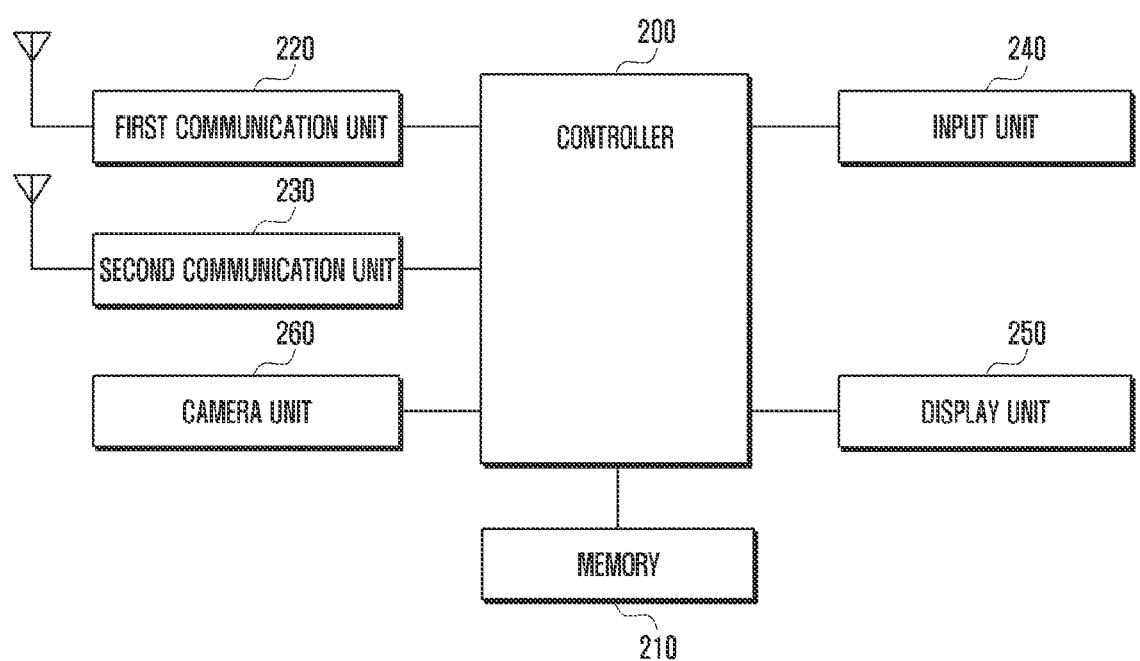
FIG. 2 illustrates a configuration of a terminal device according to an exemplary embodiment of the present invention.

FIG. 2 illustrates a configuration of a terminal device according to an exemplary embodiment of the present invention.

Referring to FIG. 2, the terminal device may be, for example, any of terminal devices 101 to 10N illustrated in FIG. 1. According to exemplary embodiments of the present invention, it is assumed that the terminal device is a mobile phone. The terminal device includes a controller 200, a memory 210, a first communication unit 220, a second communication unit 230, an input unit 240, a display unit 250, and a camera unit 260.

A first communication unit 220 and a second communication unit 230 wirelessly connect a mobile terminal to each corresponding communication network. The communication network may be a base station communication network, Internet communication network, or the like. The communication units 220 and 230 may respectively include a transmission unit comprising a frequency up-converter, which up-converts a transmission signal to an RF band, a power amplifier, a low-noise amplifier which low-noise-amplifies an RF reception signal, and a frequency down-converter which low-converts the RF signal to a bottom band. The communication units 220 and 230 may respectively include a modulation unit which modulates the transmission signal and which transmits the modulated signal to the transmission unit, and a demodulation unit which demodulates the signal outputted from the reception unit. The modulation and demodulation unit may be a 3rd Generation (3G) modulation and demodulation unit such as Wideband Code Division Multiple Access (WCDMA), Code Division Multiple Access (CDMA), and the like, or a 4th Generation (4G) modulation and demodulation unit such as, for example, Global System for Mobile Communications (GSM), Long Term Evolution (LTE), and the like. Further, the modulation and demodulation unit may also be WiFi, Wireless Broadband (WiBro), Worldwide Interoperability for Microwave Access (WiMAX), and the like.

The controller 200 controls overall operation of the mobile terminal, and is connected to the communication network and provides a cloud data communication service through the first communication unit 220 and the second communication unit 230 when data communication is performed according to an exemplary embodiment of the present invention.

The memory 210 may include a program memory for storing an operation program of a mobile terminal and programs according to an exemplary embodiment of the present invention, and a data memory for storing installation data and data generated during performance of a program. Further, according to an exemplary embodiment of the present invention, the memory 210 stores downloaded cloud data. Cloud data, which is selected as a specific function and is downloaded, is stored as data of the function under the control of the controller 200.

The input unit 240 performs a function for inputting a command for controlling operation of a mobile terminal, and data. The display unit 250 performs a function of displaying display data under the control of the controller 200. The input unit 240 and the display unit 250 may be configured as an integrated touch screen panel. The camera unit 260 takes a picture in a mobile terminal, and when necessary, the camera unit 260 may upload a picture photographed under the control of the controller 200 in the server.

The first communication unit 220 and/or the second communication unit 230 may be wirelessly connected to each base station and may perform a voice and/or data communication function, or may be connected to an Internet network and may perform data communication. The communication unit, which is connected to the base station, may include a modulation and demodulation unit of a 3G or 4G type and may perform a voice and/or data communication service, and the communication unit, which is connected to the Internet network, may be connected to an Internet server, and the like, and may perform a data communication service function. In the description below, the first communication unit 220 is a communication unit which is wirelessly connected to an Internet network 110, and may be a communication unit including a modem such as WiFi, WiBro, WiMAX type, and the like. The second communication unit 230 may be connected to a base station, and may be a communication unit including a modem for a voice and data communication, such as a GSM, CDMA, WCDMA, LTE type, and the like. The second communication unit 230 may also be connected to the Internet network 110 through the base station. Further, it is assumed in FIG. 2 that there are 2 communication units. However, exemplary embodiments of the present invention may include a plurality of base stations (e.g., base stations using a GSM, WCDMA, LTE type, and the like) and a plurality of communication units. For example, it is assumed that the communication unit is composed of a first communication unit and a second communication unit. However, exemplary embodiments of the present invention may include three or more communication units.

The terminal device having the above configuration may work as a client of the server 120. According to exemplary embodiments of the present invention, the menu structure on cloud data of the server 120 and the terminal device are synchronized as the same structure. Further, the server 120 may include meta information synchronized with the terminal device, and actual data corresponding to the meta information. In contrast, the terminal device may include only meta information or may include meta information and actual data corresponding thereto.

A terminal device having the configuration of FIG. 2 according to an exemplary embodiment of the present invention processes actual data by utilizing meta information at the time of cloud data synchronization, provides a distinctive user scenario using a meta-dedicated mode (meta data only on/off), and provides a conversion concept of a meta-dedicated mode and meta-sharing mode according to the residue of the memory of the terminal device.

The terminal device having the configuration of FIG. 2 displays and processes real data stored in the server using meta information synchronized with the server. To this end, the terminal device provides a function of operating according to meta information (Meta only on/off) selected in a Settings menu. At this time, if the meta-dedicated mode (Meta only On) function is selected, all cloud data sync methods of the mobile terminal include meta data only. If specific meta information is selected in the meta-dedicated mode, the terminal device downloads real data corresponding to the meta information from the server, and executes the downloaded data in the cache area. Further, if the execution of the meta-dedicated mode is terminated, the cache area is reformatted, and a space for executing another file is prepared. In a device without a space for securing a device cache area, a space of an external memory card may be temporarily utilized for a space for execution.

If the meta-sharing mode (Meta only Off) is selected, the cloud data sync method of the mobile terminal includes meta information and real data. In such a case, the terminal device synchronizes all data of the cloud server 120 as the first meta information, and as long as allowed by the memory 210 (e.g., the memory may be a cloud area), the real data corresponding to the meta information is sequentially downloaded and stored (e.g., an operation of converting meta information into real data is performed).

To this end, the mobile terminal may perform a procedure for setting menus for performing an operation mode and cloud service according to use of the server 120 and meta information. If the setting menu is selected through the input unit 240, the controller 200 displays the selection in the display unit 250. Further, if the cloud synchronization menu is selected in the setting menu, the controller 200 displays the cloud synchronization setting menu such as, for example, the cloud synchronization setting menu shown in Table 1 below.

TABLE 1

| meta only | on/off |
| photo | on/off |
| music | on/off |
| video | on/off |
| document | on/off |
| — | — |
| — | — |
| — | — |

At this time, it is possible to set the setting menu to on/off. The "meta only" is a mode for setting a meta-dedicated mode (meta only on) or a meta-sharing mode (meta only off). Further, a music, video, photo, document, and the like may be menus which may be synchronized by a cloud service. The cloud service menu may further add other items in addition to music, videos, photos, documents, and the like. If the cloud service menus are selected (e.g., set to on), the meta information sets of the menu are synchronized between the terminal device and the server 120. At this time, at the meta-dedicated mode, only the meta information is synchronized between the terminal device and the server 110, and at the meta-sharing mode, meta information and real data are synchronized between the terminal device and the server 110.

Likewise, in a state in which the mobile terminal is synchronized with the server 120, if the cloud data is selected as a specific function, the controller 200 of the mobile terminal requests transmission of the selected cloud data to the server 120, and automatically sets the data downloaded from the server 120 as the function of the mobile terminal.

Figure 3:
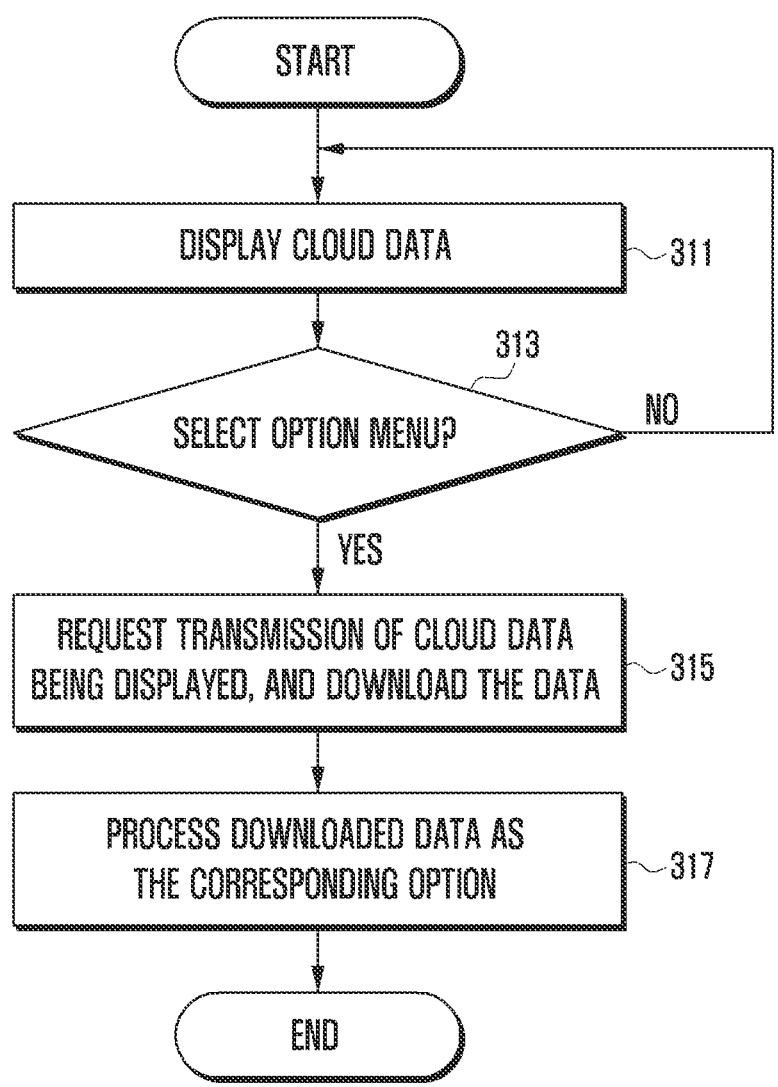
FIG. 3 is a flowchart illustrating a procedure in which a mobile terminal downloads data selected as a specific function, and automatically sets the function according to an exemplary embodiment of the present invention.

FIG. 3 is a flowchart illustrating a procedure in which a mobile terminal downloads data selected as a specific function, and automatically sets the function according to an exemplary embodiment of the present invention.

Referring to FIG. 3, the controller 200 displays information of a cloud service menu (e.g., it may be meta information) through the display unit 250 in step 311. In the above state, if user selects an option menu for setting a specific function, the controller 200 detects the selection and displays the selected option menu in step 313, and thereby enabling the user to analyze the selected option menu. Thereafter, the controller 220 requests transmission of selected data to the server 120, and downloads data transmitted from the server in step 315. In step 317, the controller 220 stores the downloaded data as the data of the function in the memory 210 and automatically sets the function as the downloaded data.

The method of processing data of a terminal device according to an exemplary embodiment of the present invention may include a process of processing cloud data, a process of requesting a download of the cloud data when selecting a function menu in the process of processing the cloud data, and/or a process of automatically setting the downloaded cloud data as the data of the selected function.

The cloud data may be a picture image, the function menu may be a screen selection menu, and the screen selection menu may also be a menu such as a home screen, a lock screen, a contact number icon, a lock and home screen, and the like. For example, the screen selection menu may set a photo image as the background screen (e.g., wallpaper) or a contact number icon. In the description below, it is assumed that the screen selection menu is a wallpaper menu.

Further, if the cloud data is a music file, the function menu may be set as a tone selection menu of the mobile terminal, and the tone selection menu may also be a menu such a call ring, a message ring, a message ring, an SNS ring, an alarm ring, and the like.

Figure 4:
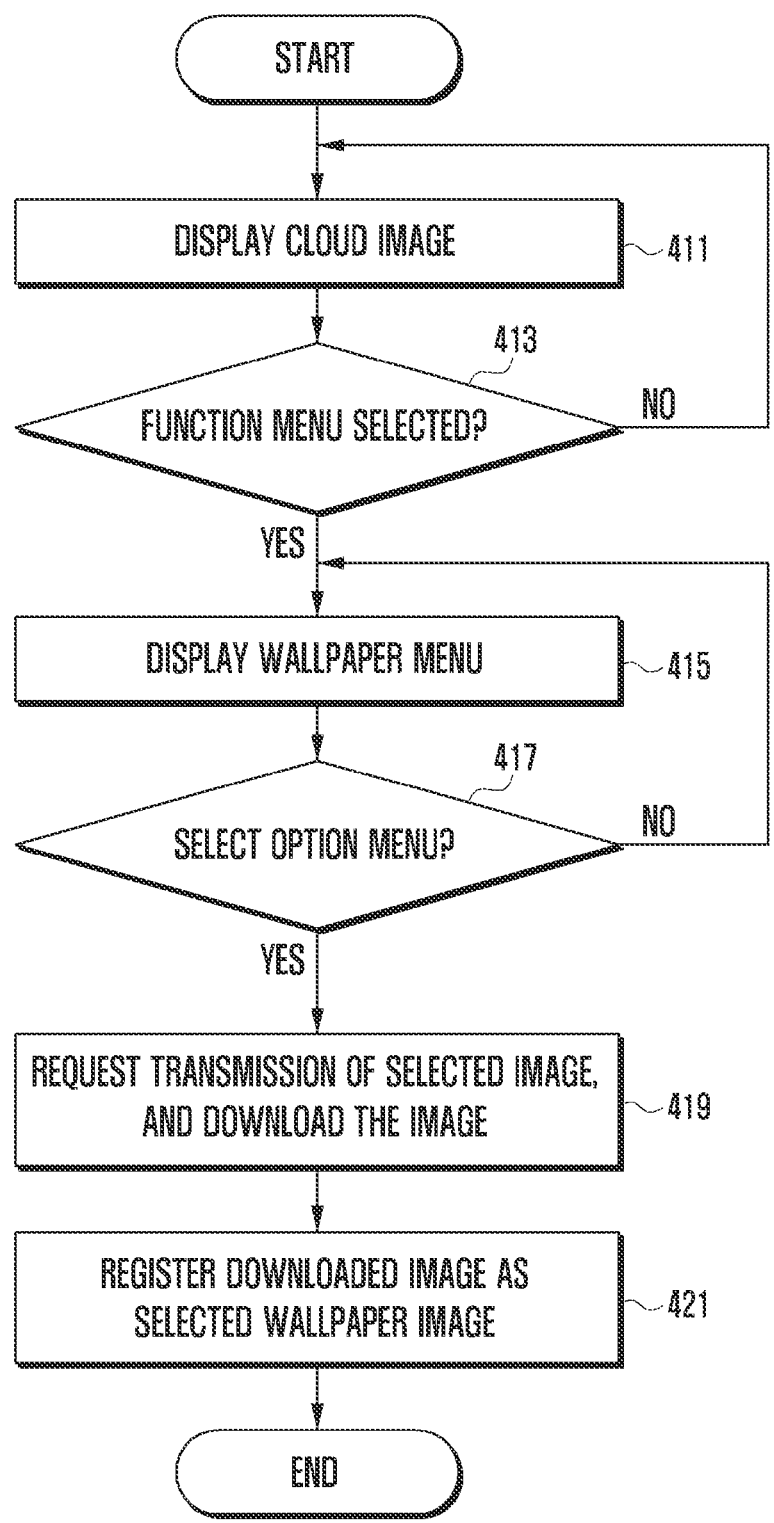
FIG. 4 is a flowchart illustrating a procedure for automatically setting cloud data as a background screen as an example of setting a function of a mobile terminal according to an exemplary embodiment of the present invention.
Figure 5:
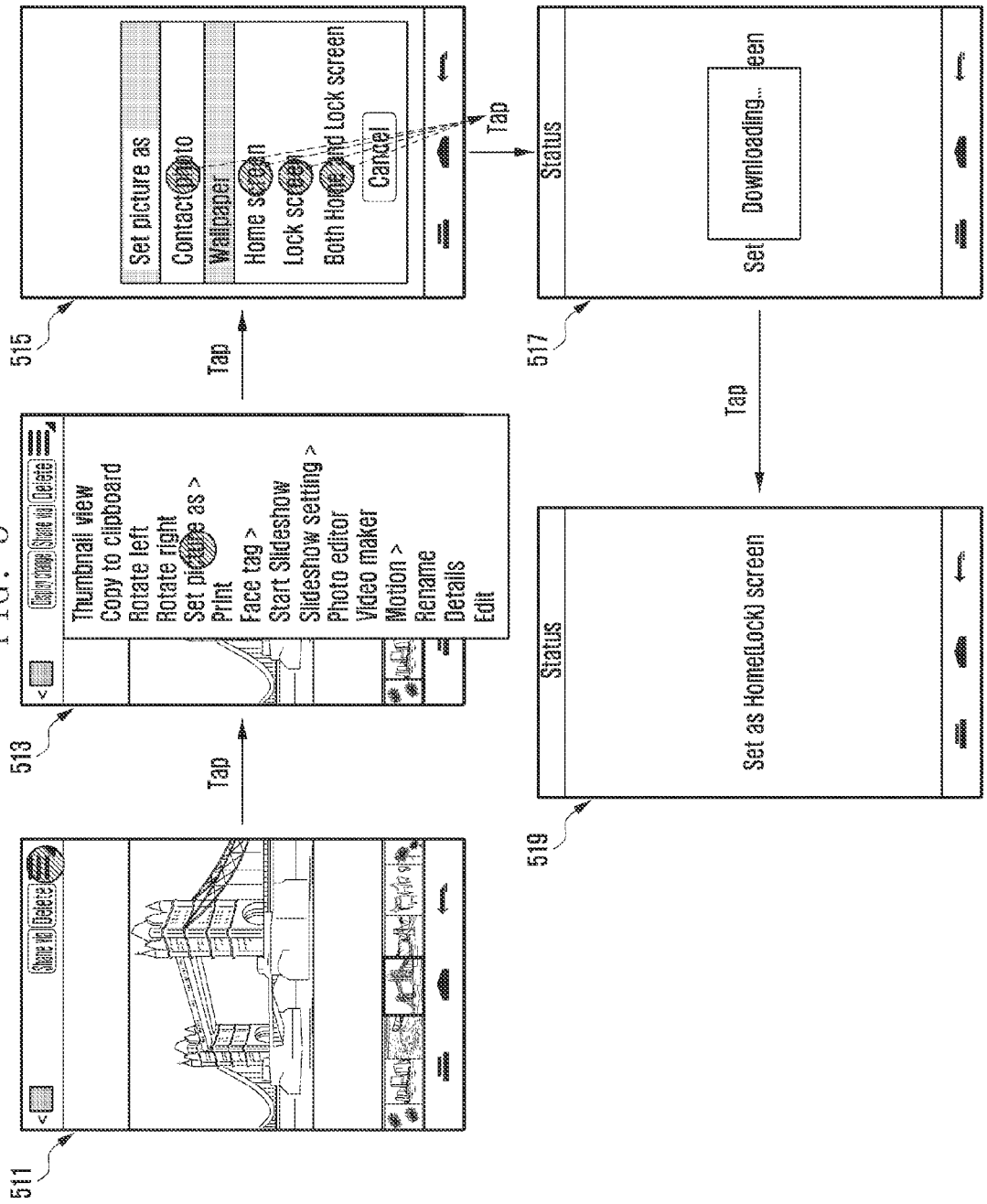
FIG. 5 illustrates an example of setting a background screen as a procedure such as, for example, the procedure illustrated in FIG. 4 according to an exemplary embodiment of the present invention.

FIG. 4 is a flowchart illustrating a procedure for automatically setting cloud data as a background screen as an example of setting a function of a mobile terminal according to an exemplary embodiment of the present invention. FIG. 5 illustrates an example of setting a background screen such as, for example, the procedure illustrated in FIG. 4 according to an exemplary embodiment of the present invention.

Referring to FIGS. 4 and 5, the controller 200 displays a cloud image or meta information of the cloud image in step 411. The cloud image is an image stored in the server 120, and may be one image, a plurality of images, or moving pictures. Further, the mobile terminal may download and display an image stored in the server 210 when necessary. In the above state, a user may select a function menu, and the function menu includes meta information of the displayed image or a function menu of setting the image as the background screen (wallpaper) of the mobile terminal. If the function menu is selected, the controller 200 displays a function menu including a menu for detecting the selection and setting the background screen in step 413. For example, the controller 200 determines whether a user selects a function menu. Further, if a function menu for setting the wallpaper is selected in the display function menu, the controller 200 displays types of the set wallpapers in the selected function in step 415. For example, the controller displays the wallpaper menu. For example, as illustrated in reference numeral 511 of FIG. 5, in a state in which the cloud image is displayed, if user selects a function menu, a function for setting is displayed as shown in reference numeral 513. As shown in reference numeral 513, in a state in which the function menu is displayed, if user selects a function menu ("set pictures as" menu) for setting the wallpaper, the controller 200 detects the selection in step 413, and displays types of the wallpaper which may be set in the "set pictures as" menu as in reference numeral 515. Some examples of the types of the wallpaper include a "home screen", a "lock screen", "both home and lock screen", and the like as shown in reference numeral 515.

In a state in which the types of the screen are displayed as described above, if a specific screen is selected through the input unit 240 as shown in FIG. 5, the controller 200 detects the selection in step 417. If the controller 220 determines that a selection is not made in step 417, the controller 220 returns to step 415. In contrast, if the controller 220 detects that a selection is made in step 417, the controller 220 requests transmission of an image being displayed to the server 120 in step 419, and downloads an image transmitted from the server 120 as illustrated in reference numeral 517. Further, the controller 220 automatically stores a downloaded image in the storage area of the screen of the memory 210 as illustrated in reference numeral 519, and thereafter displays the image in the display unit 250 when the screen is necessary in step 421.

For example, in step 421, the controller 220 registers the downloaded image as the selected wallpaper image.

As described above, in the exemplary embodiment of the present invention, if a function menu ("set pictures as" menu) for setting using a displayed image is provided and the wallpaper is selected from the function menu in a state in which the cloud image is displayed, the controller 200 may automatically register the image being displayed as the wallpaper.

Figure 6:
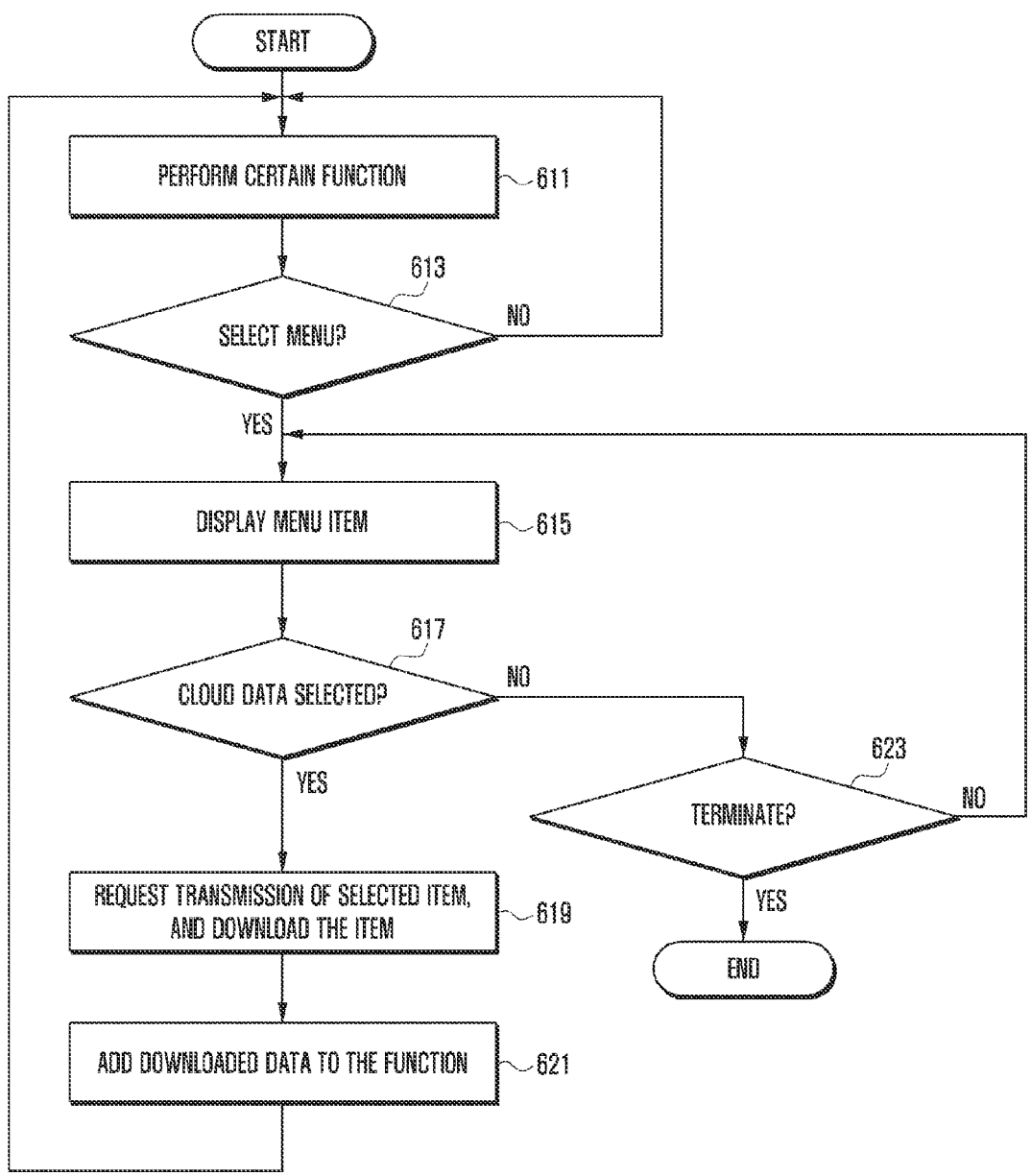
FIG. 6 is a flowchart illustrating a procedure for automatically setting cloud data as a specific tone of a mobile terminal as an example of setting a function of a mobile terminal according to an exemplary embodiment of the present invention.

FIG. 6 is a flowchart illustrating a procedure for automatically setting cloud data as a specific tone of a mobile terminal as an example of setting a function of a mobile terminal according to an exemplary embodiment of the present invention.

Referring to FIG. 6, the controller 200 replays meta information or a music file of the cloud music file in step 611. The cloud music file is a music file stored in the server 120, and the mobile terminal may request transmission of a music file to the server 120 using meta information when necessary and download and replay the music file stored in the server 120. Likewise, in a state in which the meta information of the music file is displayed or a specific music file is replayed, the user may select a function menu, and the function menu may become a menu for setting the music file of the displayed meta information or the replayed music file as a certain tone of the mobile terminal.

In step 613, the controller 200 displays the types of the function menus and the controller 200 detects a selection and determines whether the function menu (tone setting menu) is selected. If the user selects a desired function in the displayed function menu, the controller 200 displays the setting menus of the selected function in step 615. For example, in a state in which the cloud image is displayed as illustrated in reference numeral 511 of FIG. 5, a function (e.g., a tone setting menu is included), which may be set when the user selects a function menu, is displayed. In the state in which the function menu is displayed, if the user selects the tone setting menu, the controller 200 detects the selection in step 613, and displays types of tones which may be set in the tone setting menu in step 615. The types of the tones may include a calling ring tone, a message ring tone, a message ring tone, a messenger ring tone, an SNS ring tone, an alarm ring tone, and the like.

Likewise, in a state in which tone types are displayed above, the controller 200 detects a selection and determines whether a specific tone is selected through the input unit 240 in step 617. If the controller 200 determines that a specific tone is not selected, the controller 200 proceeds to step 623 in which the controller 200 prompts the user for confirmation as to whether to terminate the process. If the controller 200 receives confirmation that the process is to be terminated, the controller 200 ends the process. Otherwise, if the controller 200 does not receive confirmation to terminate the process, the controller 200 returns to step 615. If the controller 200 determines that a specific tone is selected in step 617, then the controller 200 requests transmission of the selected music file to the server 120 and downloads the music file transmitted from the server in step 619. Further, the controller 200 automatically stores the downloaded music file in the storage area of the screen of the memory 210 in step 621. Thereafter, if a call of the communication is received or an alarm is generated, the ring tone of the corresponding communication mode or the warning sound of the set alarm is replayed by replaying the registered music file.

Further, the method of processing data of the terminal device according to an exemplary embodiment of the present invention may include a process of performing a communication function, a process of requesting a download of the cloud data selected when the cloud data is selected, and a process of adding the downloaded cloud data to the communication function and automatically transmitting the data.

Here, the function menu may become a cloud data menu including a photo, video file and audio file, and the communication function may be one of a voice communication, data communication, text message communication, SNS and e-mail.

Figure 7:
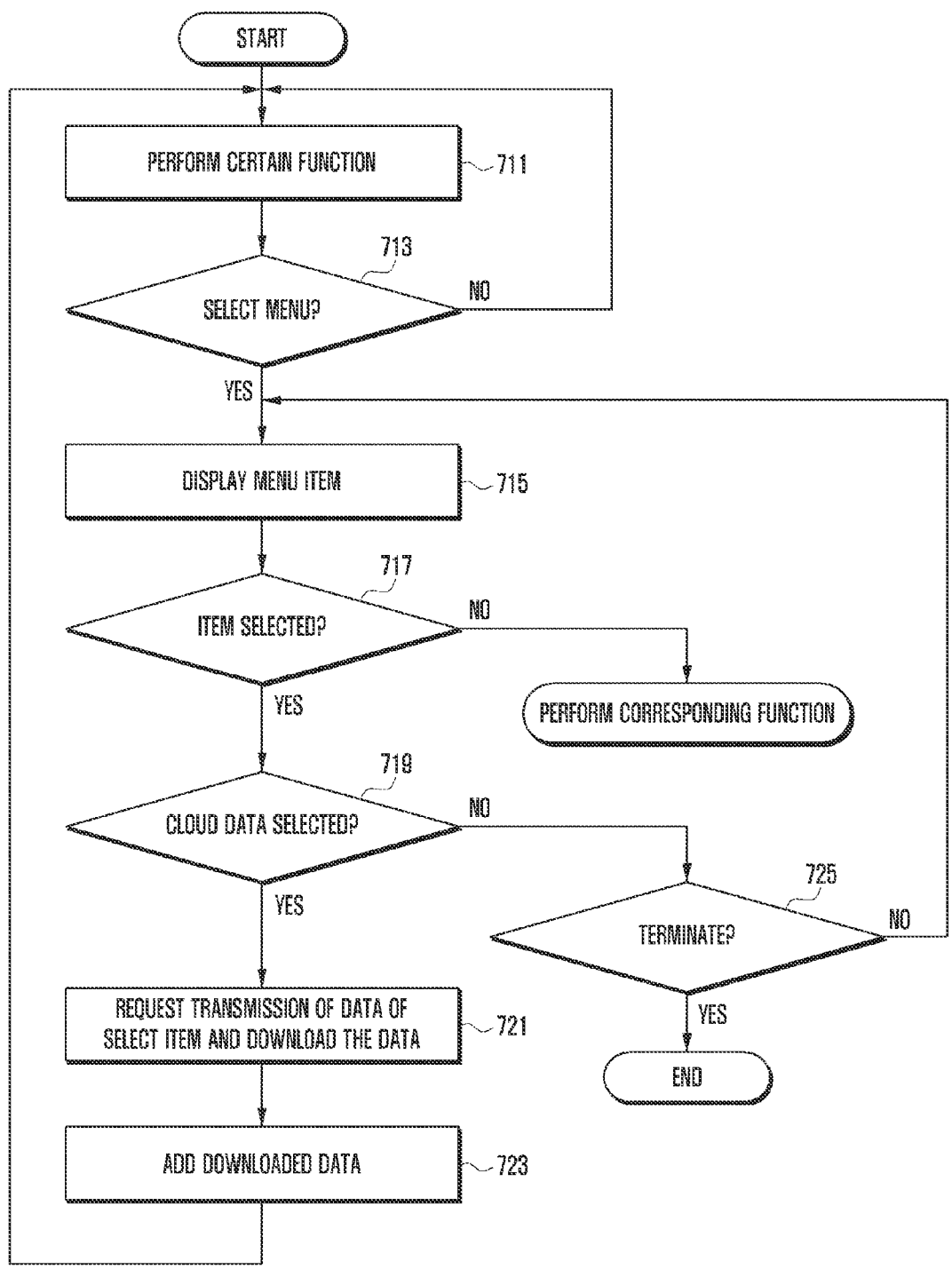
FIG. 7 is a flowchart illustrating a procedure for automatically adding and transmitting cloud data during communication as an example of setting a function of a mobile terminal according to an exemplary embodiment of the present invention.

FIG. 7 is a flowchart illustrating a procedure for automatically adding and transmitting cloud data during communication as an example of setting a function of a mobile terminal according to an exemplary embodiment of the present invention. FIG. 8 illustrates an example of adding a cloud image to an e-mail and transmitting the e-mail during an operation such as, for example, the operation of FIG. 7 according to an exemplary embodiment of the present invention.

Referring to FIGS. 7 and 8, the controller 200 performs a communication function in step 711. The communication may include various communications such as a voice call, data communication, e-mail, messenger, SNS and text message communication, and the like. As an example, it is assumed that communication is performed using a text message as illustrated in reference numeral 811 of FIG. 8.

In a state in which the above communication is performed, if a function menu is selected, the controller 200 detects the selection in step 713, and displays a function menu as illustrated in reference numeral 813 of FIG. 8 in step 715. The function menu includes menus such as pictures, video files, audio files, and the like, and if a certain function is selected from the above function menus, the menu is displayed at step 715. As an example, a case in which pictures are selected is assumed, and in such a case, the controller 200 displays a photo menu as illustrated in reference numeral 815 of FIG. 8 at step 715. At this time, when displaying the picture menu, the meta information of the picture menu may be displayed, or images of the picture menu may also be displayed. In a state in which picture menus are displayed as described above, if a certain picture image or meta information of a picture is selected, the controller 200 detects selection of an image in step 717. If the controller 200 does not detect selection of an image, the controller 200 proceeds to perform a corresponding function. In contrast, if the controller 200 does detect selection of an image in step 717, the controller 200 proceeds to step 719 in which the controller 200 determines whether the picture is cloud data. At this time, if the data is cloud data, the controller 200 detects the data at step 719, and the controller 200 requests transmission of the picture to the server 120 in step 721, and downloads the picture transmitted from the server 120 as illustrated in reference numeral 817 of FIG. 8. Thereafter, the controller 200 adds the downloaded picture, and transmits the picture to the opponent subscriber under communication as illustrated in reference numeral 819 in step 723. Otherwise, if the controller 200 determines that the picture is not cloud data in step 719, then the controller 200 proceeds to step 725 in which the controller 200 prompts the user for confirmation as to whether to terminate the process. If the controller 200 receives confirmation that the process is to be terminated, the controller 200 ends the process. In contrast, if the controller 200 does not receive confirmation to terminate the process, the controller 200 returns to step 715.

FIGS. 7 and 8 illustrate a procedure of downloading a picture image and automatically adding the downloaded image to a message and transmitting the message during text message communication according to an exemplary embodiment of the present invention. However, communication may be applied to other communications (a voice call, data communication, e-mail, SNS, and the like) in addition to a text message communication in the same manner, and the added cloud data may be a video or audio file in addition to the picture image. Further, a plurality of data sets (e.g., a picture and video, video and audio, and/or picture and audio) may also be added.

Likewise, according to an exemplary embodiment of the present invention, in a state in which cloud data is displayed and/or processed, if a specific function (wallpaper, tone, and the like) of the mobile terminal is selected, the mobile terminal may automatically download cloud data, which is being displayed or processed, and set the data as the function. Further, in a state in which communication is performed, if the cloud data is selected, the mobile terminal may download automatically selected cloud data, add the downloaded data to the communication function, and transmit the downloaded data. Hence, the cloud service method according to an exemplary embodiment of the present invention may set the cloud data as the function without performing operations of several times. For example, the procedure may be performed by downloading a cloud file from the serving within the current application without performing a dedicated application for the downloading of the file within the cloud within the mobile terminal.

While the present invention has been shown and described with reference to certain exemplary embodiments thereof, it will be understood by those skilled in the art that various changes in form and details may be made therein without departing from the spirit and scope of the present invention, as defined in the appended claims and their equivalents.

What is claimed is:

1. A method of processing data of a terminal device, the method comprising:
   processing selected cloud data;
   selecting a function menu while processing the selected cloud data, wherein the function menu comprises one or more functions;
   selecting at least one function from the function menu;
   requesting a download of the selected cloud data in accordance with the selected function;
   downloading the selected cloud data; and
   automatically setting the function on the terminal device to the downloaded cloud data.

2. The method of claim 1, wherein the selected cloud data is a photo image, and the function menu is a screen selection menu.

3. The method of claim 2, wherein the functions of the screen selection menu include one of a contact number icon, a home screen, a lock screen, and a lock and home screen.

4. The method of claim 3, wherein the automatically setting of the function on the terminal device to the downloaded cloud data comprises automatically setting the downloaded cloud data as an image of selected wallpaper.

5. The method of claim 1, wherein the selected cloud data is a music file, and the function menu is a tone selection menu of the mobile terminal.

6. The method of claim 5, wherein the functions of the tone selection menu include one of a calling ring tone, a message ring tone, a Social Networking Service (SNS) ring tone, and an alarm ring tone.

7. The method of claim 6, wherein the automatically setting of the function on the terminal device to the downloaded cloud data comprises automatically setting the downloaded cloud data as a tone for a selected function from the tone selection menu.

8. A method of processing data of a terminal device, the method comprising:
   performing a communication function;
   selecting cloud data in a state in which the communication function is performed;
   requesting a download of the selected cloud data;
   downloading the selected cloud data; and
   adding the downloaded cloud data to the communication function and automatically transmitting the data within the communication function.

9. The method of claim 8, further comprising:
   displaying a cloud data menu including a photo, a video file, and an audio file when selecting a function menu during performance of the communication function.

10. The method of claim 9, wherein the communication function is one of a voice communication, data communication, text message communication, Social Networking Service (SNS), and e-mail.

11. A mobile terminal, which is synchronized with a server, for processing cloud data, the mobile terminal comprising:
    a communication unit for communicating with a server storing cloud data through an Internet network;
    a memory for storing downloaded cloud data;
    a display unit for displaying the cloud data; and
    a controller displaying the cloud data, selecting a function menu in a state in which the cloud data is displayed, wherein the function menu includes one or more functions, requesting a download of the selected cloud data through the communication unit, downloading the selected cloud data, and automatically setting the function on the mobile terminal to the downloaded cloud data.

12. The mobile terminal of claim 11, wherein the downloaded cloud data is a photo image, and the function menu includes selecting the photo image as one of a contact number ion, a home screen, a lock screen, and a lock and home screen.

13. The mobile terminal of claim 12, wherein the controller automatically sets the photo image as an image for a selected screen.

14. The mobile terminal of claim 11, wherein the downloaded cloud data is a music file, and the functions of the function menu include at least one of a calling ring tone, a message ring tone, a Social Networking Service (SNS) ring tone, and an alarm ring tone.

15. The mobile terminal of claim 14, wherein the controller is configured to automatically sets the music file as a tone for a selected function from the tone selection menu.

16. The mobile terminal of claim 11, wherein the controller initiating a communication function, wherein the selecting the cloud data is performed during the communication function, the downloaded cloud data is added to the communication function and automatically transmitted within the communication function.

17. The mobile terminal of claim 16, wherein the function menu includes a photo file, a video file, and an audio file, and the communication function is one of a voice communication, data communication, text message communication, Social Networking Service (SNS), and e-mail.

18. A method of processing cloud data in a terminal device, the method comprising:
    displaying cloud data;
    displaying a screen menu which may be set when selecting a screen setting function in a state in which cloud data is displayed;
    selecting a screen from the displayed screen menu;
    downloading the cloud data; and
    automatically setting the selected screen to the downloaded cloud data.

19. The method of claim 18, wherein the cloud data is a photo image, and the screens of the screen menu include a contact number icon, home screen, lock screen, and lock and home screen.

* * * * *